(12) United States Patent
Mason et al.

(10) Patent No.: US 6,346,778 B1
(45) Date of Patent: Feb. 12, 2002

(54) AC POWER CONVERTER

(75) Inventors: Murray Mason; Qunying Yao, both of Mordialloc (AU)

(73) Assignee: Bytecraft PTY LTD (AU)

(*) Notice: Subject to any disclaimer, the term of this patent is extended or adjusted under 35 U.S.C. 154(b) by 0 days.

(21) Appl. No.: 09/233,245

(22) Filed: Jan. 19, 1999

(30) Foreign Application Priority Data

Jan. 20, 1998 (AU) .................................... PP1390
Sep. 4, 1998 (AU) .................................... PP5727

(51) Int. Cl.$^7$ ................................................ G05F 1/00
(52) U.S. Cl. ...................... 315/291; 315/307; 323/223
(58) Field of Search .............................. 315/291, 307, 315/DIG. 4; 363/34, 123, 140, 159, 163, 173, 74, 78, 95, 98; 323/909, 223, 901

(56) References Cited

U.S. PATENT DOCUMENTS

| | | | | |
|---|---|---|---|---|
| 4,352,156 A | * | 9/1982 | Gyugyi | 363/163 |
| 4,729,082 A | * | 3/1988 | Sato | 363/96 |
| 4,866,592 A | * | 9/1989 | Fujii et al. | 363/98 |
| 5,285,365 A | * | 2/1994 | Yamato et al. | 363/159 |
| 5,424,618 A | * | 6/1995 | Bertenshaw et al. | 315/324 |
| 5,436,819 A | * | 7/1995 | Mikami et al. | 363/98 |
| 5,497,332 A | * | 3/1996 | Allen et al. | 364/483 |
| 5,559,688 A | * | 9/1996 | Pringle | 363/89 |
| 5,568,373 A | * | 10/1996 | Small | 363/98 |
| 5,600,548 A | * | 2/1997 | Nguyen et al. | 363/41 |
| 5,604,411 A | * | 2/1997 | Venkitasubrahmanian | 315/307 |
| 5,747,972 A | * | 5/1998 | Baretich et al. | 323/223 |
| 5,751,567 A | * | 5/1998 | Toyozaki et al. | 363/84 |
| 5,790,392 A | * | 8/1998 | Eklund et al. | 363/78 |
| 5,790,396 A | * | 8/1998 | Miyazaki et al. | 363/98 |
| 5,856,919 A | * | 1/1999 | Moriarty, Jr. | 363/101 |
| 5,929,665 A | * | 7/1999 | Ichikawa et al. | 363/98 |
| 5,959,855 A | * | 7/1999 | Ishii | 363/95 |
| 5,978,243 A | * | 11/1999 | Ishii et al. | 363/89 |

* cited by examiner

*Primary Examiner*—Don Wong
*Assistant Examiner*—Thuy Vinh Tran
(74) *Attorney, Agent, or Firm*—Jenkens & Gilchrist

(57) ABSTRACT

A power converter is disclosed. In one embodiment, the power converter includes an input for receiving a supply power; a switching device for controlling of power delivered to an output load; a controller for controlling the operation of the switching device; a first and second sensing circuit for providing first and second signals indicative of voltage and current inputs, respectively, to the converter; and a detector to detect a difference in polarity between the first and second signals; wherein the switching device is operable to switch between a first and second state, the first state being 'on' and the second state being 'off', and wherein the controller causing the switching device to be in the first state responsive to a detected difference in polarity between the signals to thereby dissipate a residual energy in the power converter.

15 Claims, 12 Drawing Sheets

Alternative Switching Arrangements

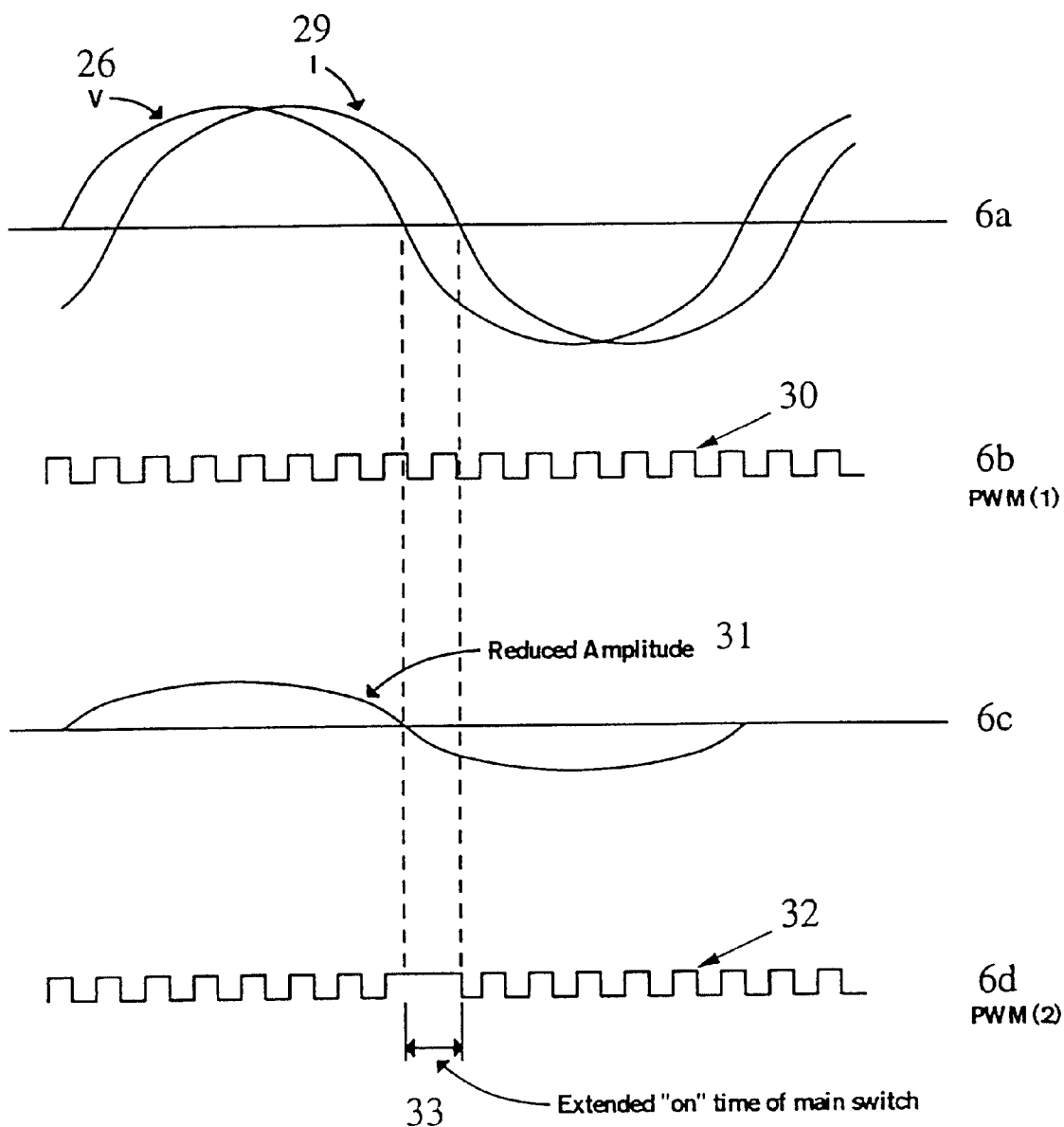

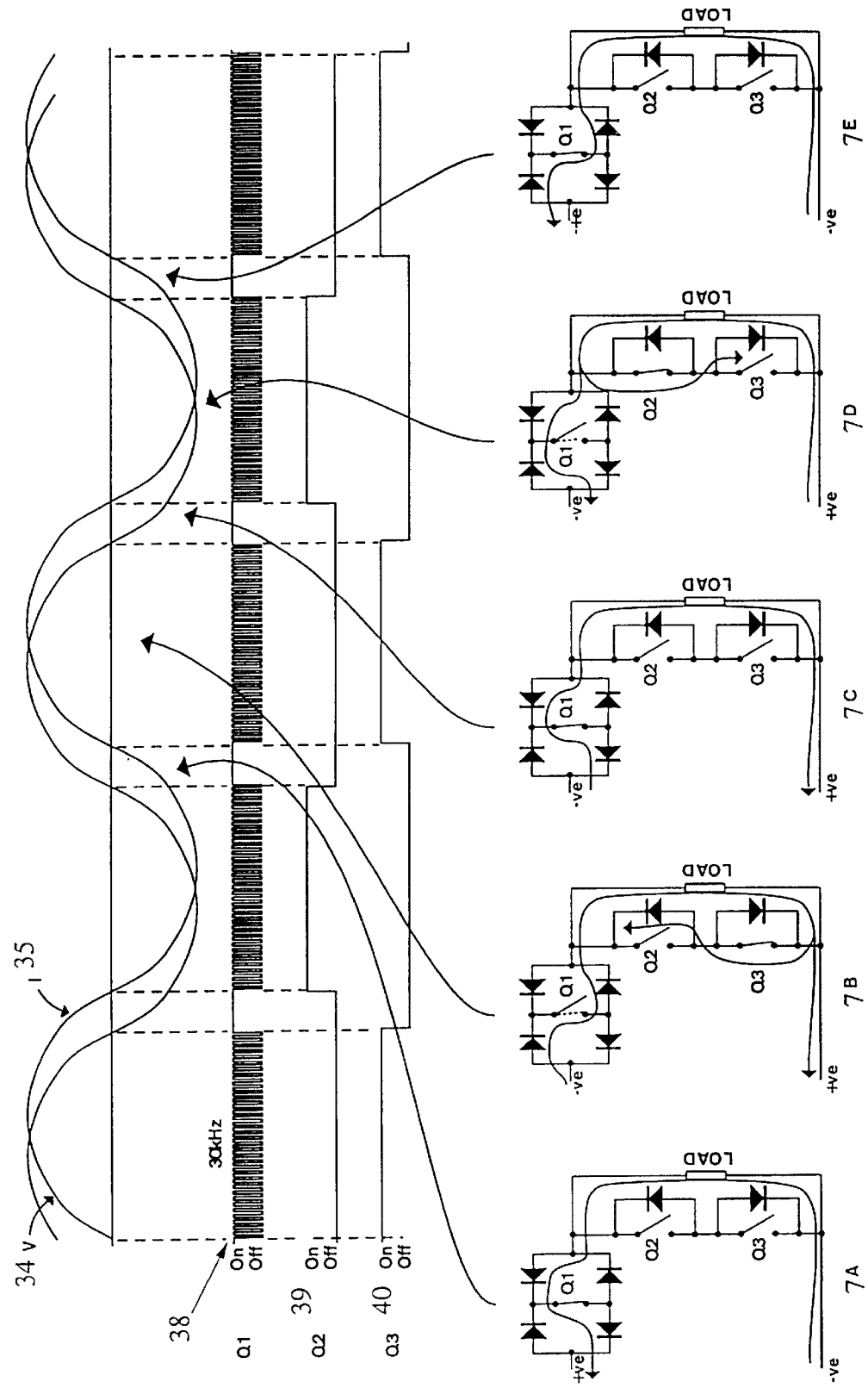

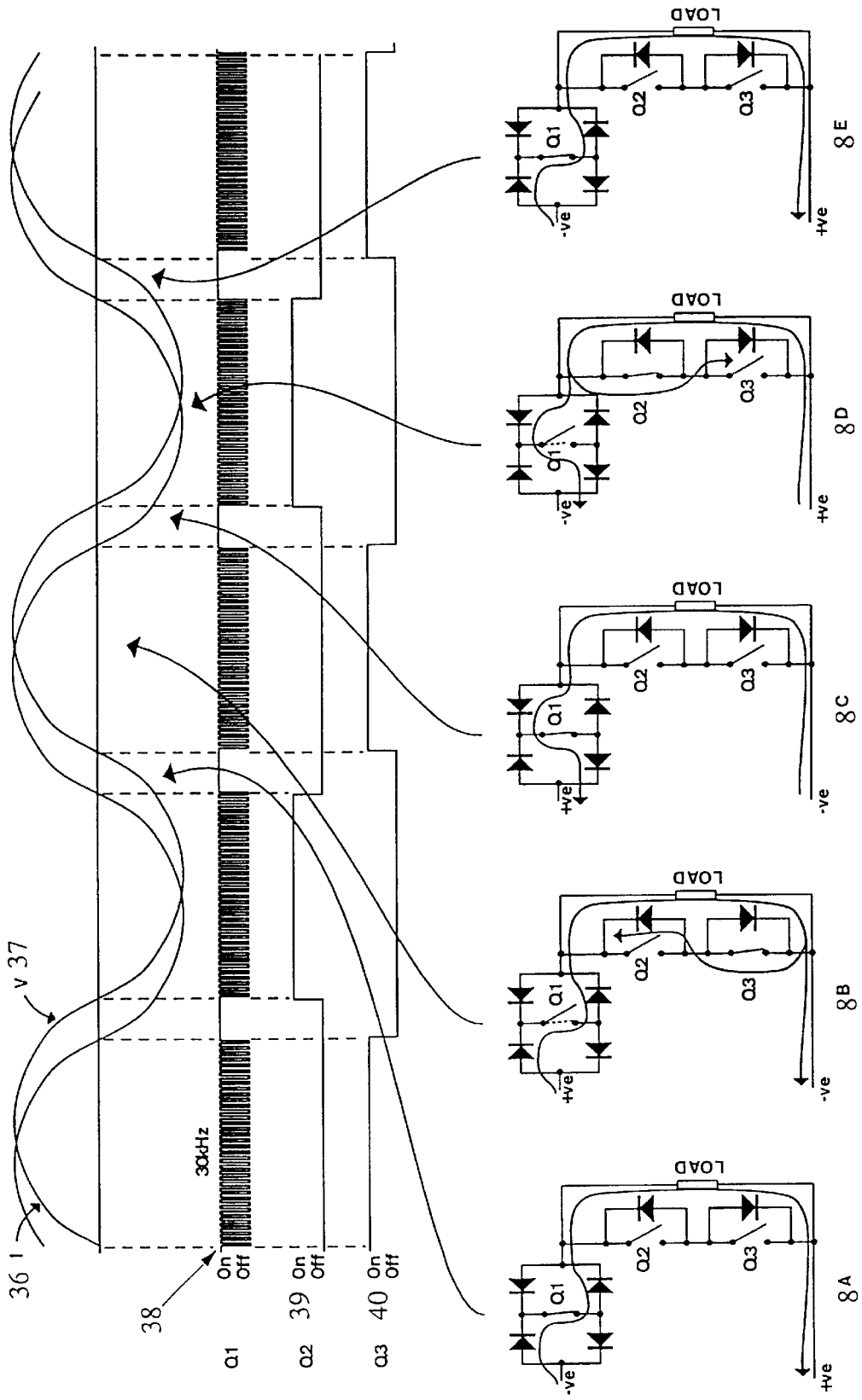

Solution Sine System

AC POWER CONVERTER

FIELD

Figure 1A:
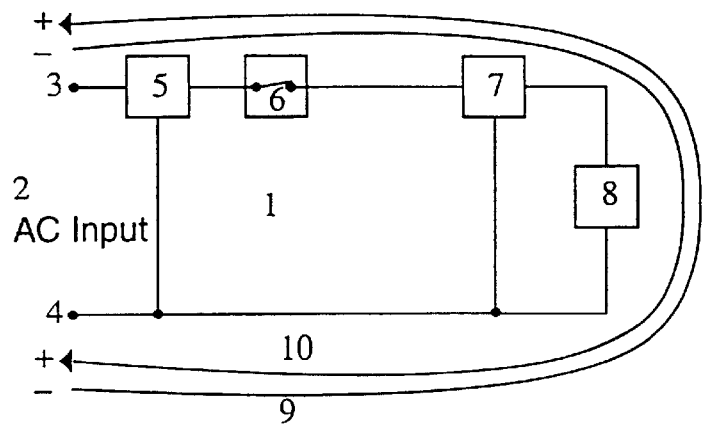

The present invention relates to apparatus used in power control, such as apparatus for controlling the power level in an AC electrical circuit. Such an apparatus is referred to as an AC power converter. In one form, the present invention particularly relates to a power converter suitable for use in lighting dimmer control although other applications of the present invention are not to be excluded from the scope of the present application. A number of aspects of the power converter are disclosed.

BACKGROUND OF THE INVENTION

The prior art teaches us about power converters based on a variety of technologies. These techniques can be broadly divided into linear and switching types, and U.S. Pat. No. 5,500,575 discloses a number of examples of linear and switching power converter technologies. Two of these are "Phase Control" and PWM.

One converter disclosed in the prior art is a high frequency, switch-mode power converter operating on the Pulse Width Modulation or "PWM" principal. PWM converters may again be further subdivided into a variety of types: "Direct" converters, "Indirect" converters, "L-bridge" and "H-bridge" for example.

A number of problems exist with prior art PWM power converters.

For a PWM converter of the prior art, in normal operation, power is transferred from the mains to the load when the input voltage and current waveforms are substantially of the same polarity and when the main switch is "on". This type of converter includes an output filter without which the converter output to the load would contain substantial harmonics of the switching frequency.

One problem of the prior art occurs when the load is reactive (Capacitive or Inductive). Referring to FIG. 1A, 1B, 1C and 1D, a schematic of prior art power converter 1 is shown having an input 2 comprising active terminal 3 and neutral terminal 4, input filter 5, main-switch 6. output filter 7 and load 8. In the positive half cycle of the AC input waveform, current flows as shown by arrow 9. Conversely, in the negative half cycle, current flows as shown by arrow 10.

Consider the inductive load case and when the main-switch is turned "off". Due to the residual energy stored in the inductor 8, the current flowing in the load has a tendency to continue to flow even when the main-switch is "off". However, because there is no path for the current flow, the energy stored in the inductor causes a voltage to develop across the load. Referring to FIG. 1B. the arrow 11 indicates this voltage.

However, if this voltage is allowed to develop unchecked, it can rise to levels that can damage the components of the power converter: a voltage "spike". One way to avoid this problem is to provide a path for the inductor current to continue to flow even when the main-switch is "off". This current is often termed "free-wheeling current". Typically a secondary switch device 12 (FIG. 1C), also known as sub-switches is provided to carry this freewheeling current 13 and thus eliminate the voltage spike. Typically the sub-switches are arranged in pairs, one each for positive and negative half cycles. However, for simplicity, FIG. 1C shows only one such switch. The sub-switches of the prior art are typically operated at line frequency and when the load current polarity and input voltage polarity are the same, the prior art works satisfactorily.

Figure 1B:
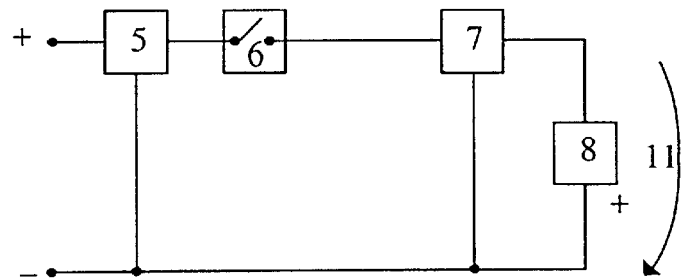
Figure 1C:
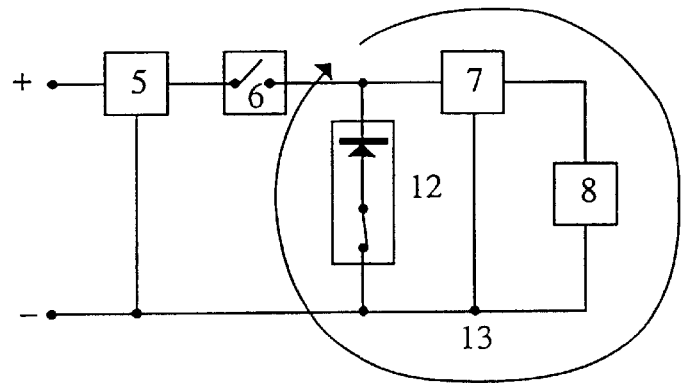
Figure 1D:
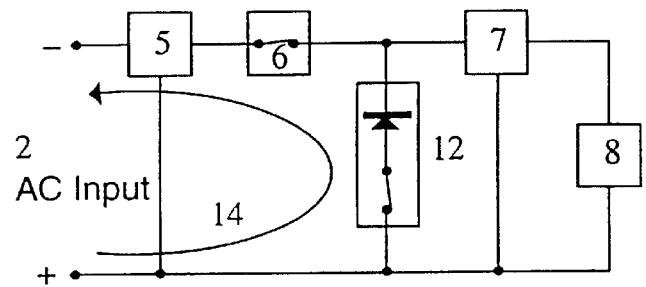

However, when the load current and input voltage are of opposite polarity, as illustrated in FIG. 1D, the prior art no longer works satisfactorily. In the figure it can be seen that the "on" main-switch and "on" sub-switch form a short circuit across the AC Input 2. In this circumstance special techniques are required to prevent this short circuit and consequent dangerous current spike.

These techniques are typically complex, bulky, inefficient, expensive or only partially successful. Furthermore, the output filter renders almost all loads to be reactive and thus exposed to this problem.

Canadian Patent 2107490 discloses one arrangement designed to address the problem of freewheeling currents. This arrangement necessitates the use of sub-switches which are controlled to switch on when the Main switch is switched off. In this way, the sub-switches provide the current path for the freewheeling current. One problem, however, with this technique is that the sub-switches must be of a similar specification to Main switch because they usually operate at the same frequency as the Main switch. This leads to relatively higher cost and lower efficiency.

In the prior art, another separate and distinct problem exists, namely that prior art circuits are usually designed to operate optimally at a particular load output. However, problems occur when the circuit is used at a relatively lower power output than that of the initial design.

Figure 2:
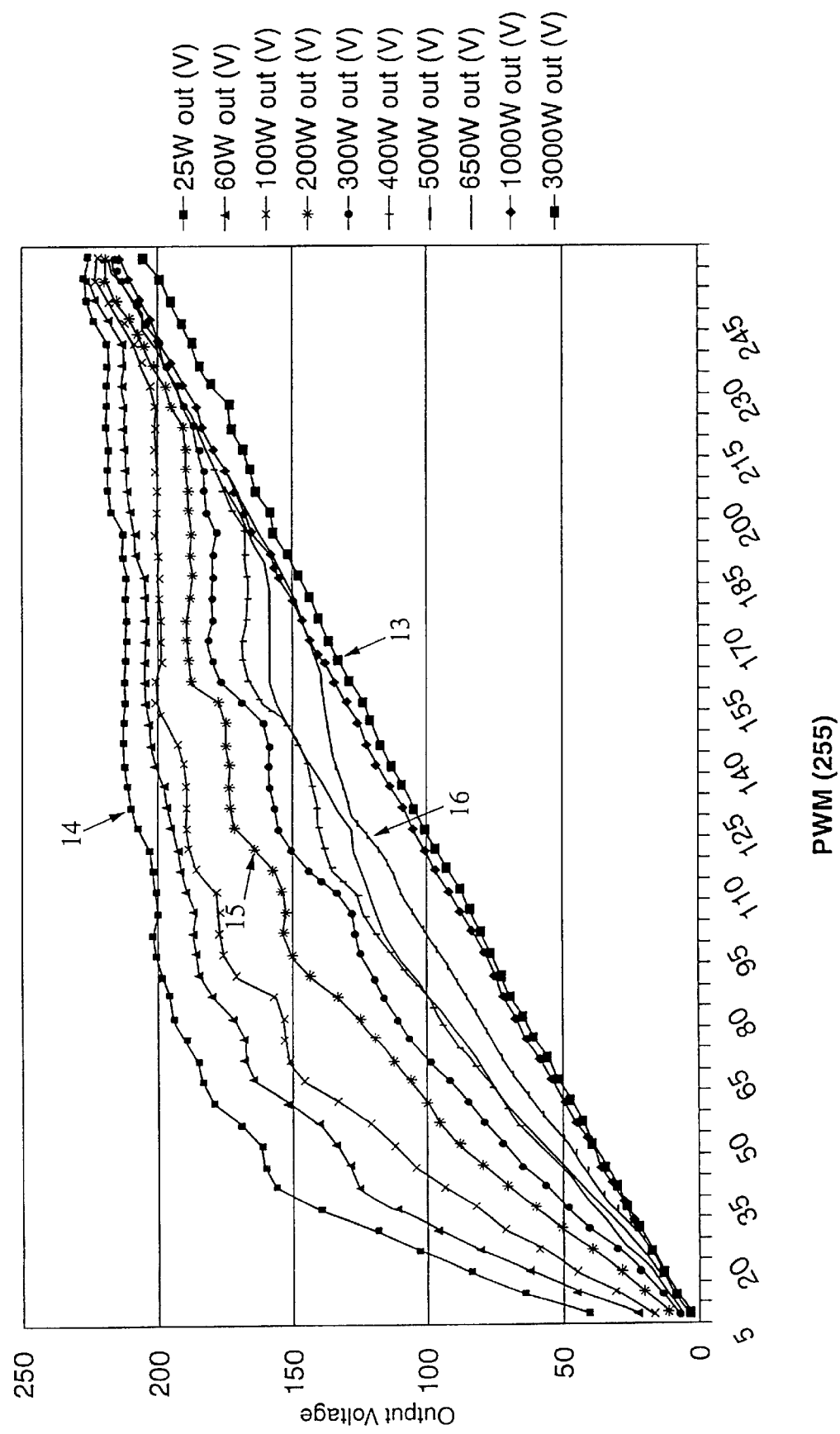

The output filter as illustrated schematically in FIG. 1A usually comprises an inductor and capacitor. Under normal operation with large loads with low internal impedance, the charge that would otherwise accumulate on the filter's capacitor is discharged into the load. However, with small loads, the charge tends to accumulate on the capacitor with each PWM switching cycle. This is because the charging source impedance (the filter) is higher than the discharge impedance (the load) so that the capacitor voltage tends to approach line potential with each successive PWM pulse. In effect, when the main-switch is "off", the load continues to be driven by the capacitor. The result is that with small loads and low to medium output level settings, the output of the converter is distorted and the transfer characteristic of the converter is impaired. FIG. 2 illustrates the transfer characteristic for a power converter designed for an output Of Up to 3 KW. On the vertical axis, output voltage is illustrated, and in this example from 0 to 250 volts. It would be readily appreciated that the range of voltage is not limiting in describing the present invention. On the horizontal axis, a percentage of pulse width of PWM is illustrated, ranging from 0 to 255, being an eight-bit binary representation of 0 to 100%. As can be seen by the line denoted 13, the characteristic is relatively linear for operation at 3 KW output. This is the intended transfer characteristic for the particular circuit plotted. Compare this, however, to line 14 illustrating operation at 25 W output, line 15 illustrating operation at 200 W output and line 16 illustrating operation at 650 W output. The transfer characteristic as represented by each of numerals 14, 15 and 16 is not relatively linear. Thus, the output of the circuit is not linearly proportional to the percentage PWM, resulting in the output for line 14 (at 50 PWM) being approximately 160 volts rather than approximately 40 volts for line 13.

U.S. Pat. No. 5,500,575 describes a means of using the sub-switches to discharge the filter capacitor under certain load conditions. The problem with this technique is that it is not considered progressive in operation, it is relatively complex to implement and requires high-speed sub-switches.

Still further problems are associated with the prior art in relation to detecting and minimising the problems resultant from surge currents circulating within the circuit. U.S. Pat. No. 5,500,575 discloses a form of current limiting however the current sensing is done at the load side of the output filter and is thus considered to be not as effective because it is affected by the filter time constant. Also, the prior art cannot protect the circuit, particularly the main switch, against over-current and/or short circuit in the sub-switches.

Another problem with the prior art concerns remote control.

Theatrical/Professional dimmers have been remotely controlled for many years, even in times preceding solid state phase control dimmers. In this context "Remote Control" refers to the ability to command the output level of the dimmer from a remote location. This has been accomplished in a number of ways, ranging from individual control wires for each channel carrying a voltage reference proportional to level (e.g. 0 to 10 Volts), to various analogue and digital multiplexing schemes. AMX and DMX are acronyms for Analogue and Digital Multiplex control standards.

Around 1987 when the first "Digital" dimmers were introduced, this remote control concept began to evolve to encompass a variety of functions in addition to simply commanding output level. Various proprietary protocols have emerged as a result.

Another byproduct of the emergence of the Digital Dimmer was the provision of a wide range of functions that could be performed within the dimmer. Previously, about the only thing that the user could perform in relation to the dimmer was to modify its calibration with a trimpot of something similar. Now, however, it is common for a dimmer to possess complex user interface, sometimes graphical, via which a huge number of parameters can be altered. Many current generation products can even function usefully without any "upstream" controller. This interface would typically comprise a display means (eg. LCD) and a number of dials and/or push buttons. Typically, this user interface is interfaced to the electronics of the dimmer pack in a manner that does not readily adapt to a remote or networked location of this interface.

A number of manufacturers have developed remote control and networking systems and protocols which enable many of these features to be accessed from a remote location. However these systems do not replicate the entirety of the local user interface and nor do they employ the same graphical and/or physical user interface means.

The current technology has a number of problems.

Figure 11:
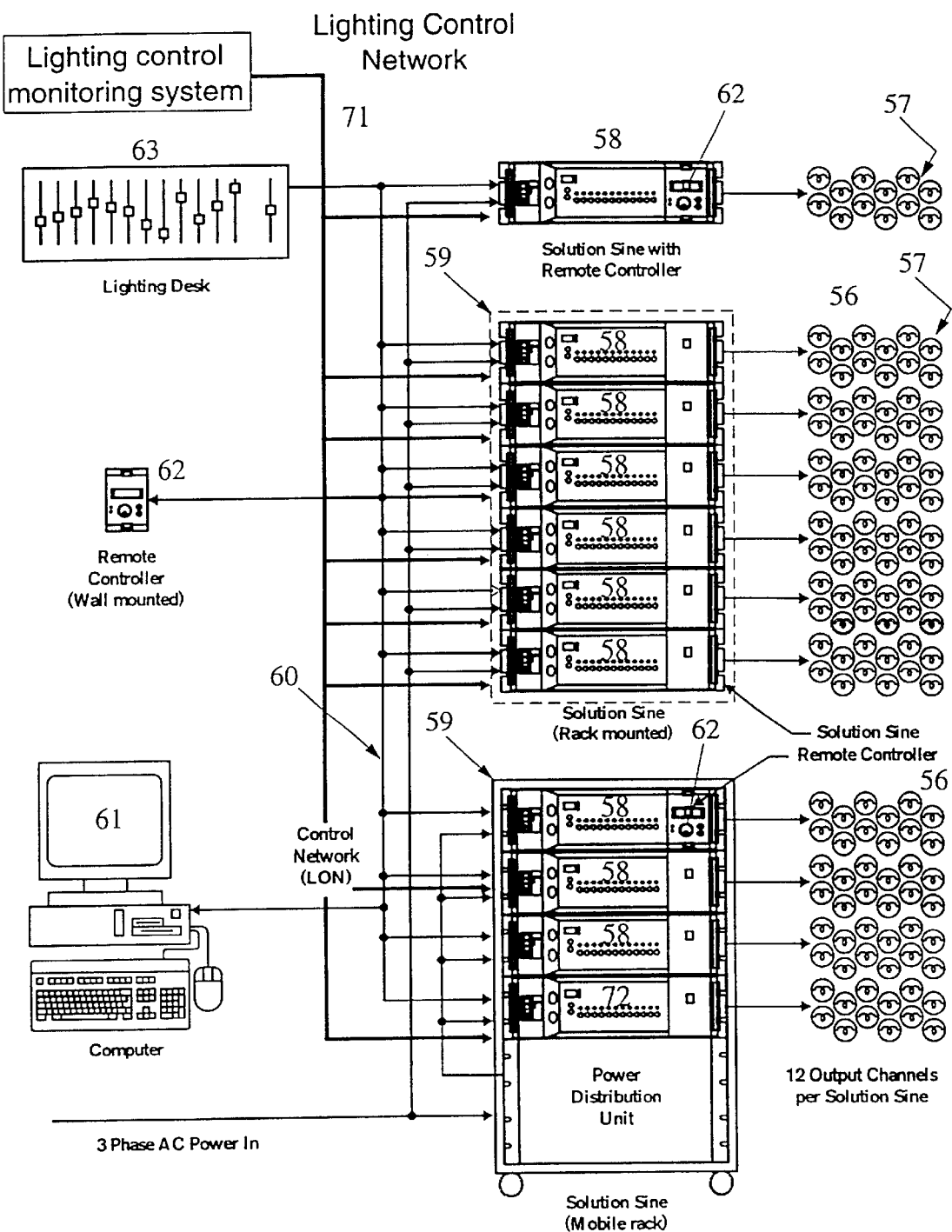

One problem is that the provision of the user interface necessary for local access to the complex internal function of the dimmer adds cost, complexity and unnecessary redundancy to the dimmer system. It is usual to employ theatrical dimmers in large numbers of channels. A typical theatre or concert system may use several hundred channels. Typically, the channels are arranged into "units" which might contain 12 channels each. In the existing technology, each unit includes a user interface facility. FIG. 11 illustrates such a collection of dimmer units by reference to numeral 59, called a "rack".

Another problem with the prior art is that the proliferation of available functions available via the typical front panel user interface renders the dimmer complicated to use and requires a heightened degree of expertise on the part of the user.

Another problem associated with the prior art is that providing ready access to the complex internal functions of the dimmer means that it is possible for unauthorised or accidental changes to be made to the settings of the dimmer.

SUMMARY OF INVENTION

The present invention seeks to alleviate at least one prior art problem.

Main Switch

In one aspect of the present invention a power converter is provided that can adapt to a wide range of load reactances, whether capacitive, inductive and/or resistive loads.

The present invention provides a power converter including an input means for receiving supply power, a switch means responsive to control means for providing preliminary control of power delivered to an output load, and a detecting means to detect a difference in polarity or amplitude between selected waveforms or points in the converter. In the present invention, the control means controls the operation of the switch means in a manner that enables the switch means to be 'on' when required for control purposes. Preferably, the switch means is enabled 'on' when there is a difference in polarity detected. Furthermore, preferably the switch means is enabled 'on' when a difference in polarity between voltage and current waveforms is detected.

This is basically accomplished by controlling the main switch/driver of the converter in a manner that keeps the main switch "on" when there is a difference in polarity detected between the input voltage and current to the converter. In this way the energy stored in the reactive load which might otherwise give rise to destructive spikes (current and/or voltage) in the converter is directed back to the mains supply. Preferably, a difference in polarity may reside between input voltage and voltage across the main switch.

The present invention will be described as it would be applied to an L-Bridge, Direct conversion PWM power converter of basic circuit topology similar to that described in U.S. Pat. No. 5,424,618. This type of converter comprises a "main switch" which, essentially, connects the mains supply to the load, and a "sub switch" which is, essentially, connected in parallel with the load. As previously described, PWM converters may be subdivided into a variety of types: "Direct" converters, "Indirect" converters, "L-bridge" and "H-bridge" for example. Although the present invention is disclosed with reference to a L-Bridge Direct-converter design, it should be noted that some aspects of the present invention have equal application to other types of converters. The embodiment described is a preferred embodiment, but not the only embodiment.

One application of the present invention is directed to a dimmer in which pulse width modulation (PWM) of the input waveform is used to control the output waveform. In a preferred form, a high frequency PWM signal samples the input waveform.

The pulse width modulation may be implemented in conjunction with an IGBT or other switching device (eg. MOSFET) and control circuit used as a "main switch". By changing the PWM duty cycle, it is possible to effect an amplitude change in the output waveform.

If there is an inductive or capacitive load, there is a relative lag or lead with regard to the voltage and current waveforms of the power signal. In use, when the control circuit of the present invention detects a lead or lag, that is a phase or polarity difference between the voltage and current waveforms, as noted above, the main switch is turned "on" and remains "on" whilst the polarity of the voltage and current waveforms is opposed. Thus, the pulse width modulation is altered. Having the main switch "on", enables energy, which in the prior art would be left to freewheel, to be fed back to the input supply. This reduces dissipation and enhances reliability and efficiency.

Where a difference in amplitude is used as a basis for detection, an appropriate amplitude detector can be used. One example may be a zero crossing detector, used to detect whether the voltage and current waveforms both cross 'zero' at the same time. If not, in accordance with the present invention, the main switch can be turned 'on' (by appropriate logic) until it has been detected that both waveforms have crossed 'zero'.

Transfer Characteristic

In accordance with another aspect of the present invention, the problem of charge build up on the output filter capacitor is addressed in a manner that substantially improves the linearity of the circuit transfer characteristic when operating in response to small load outputs.

In this regard, the present invention provides an adaptive inductance for use in an output filter of the converter. The inductance is designed to be adaptive to the current flowing in the load.

One embodiment includes the adaptive inductance of the present invention in a power converter with an "LC" output filter of "L" section topology in which the inductor is adaptive to current in the manner described above. In one particular embodiment, the inductor would comprise two otherwise conventional inductors arranged in series.

In the described embodiment, the first inductance has impedance which is relatively low at line frequency and which is relatively high at switching frequency, when compared to the load impedance. The second inductance has relatively high impedance when the load current is relatively low and has relatively low impedance at relatively high load currents at all frequencies.

The present invention is based on the realisation that the problem of non-linear transfer characteristic performance at relatively low power output is due to the design of output filters used prior to this invention. Typically the output filter, as coupled to the load, is of "L" section "LC" topology, that is to say that, it is composed of series inductance and parallel capacitance. In the prior art, the inductance of the output filter is specified to present a high impedance to switching harmonics whilst a relatively low impedance to line frequency. Also, in the prior art, the capacitance of the output filter is designed to present low impedance at switching frequencies and high impedance at line frequencies. Together the inductance and capacitance effectively block the passage of switching frequencies and harmonics to the load.

A These filters work satisfactorily when the load impedance is low, or comparable to the inductor impedance at switching frequencies. In normal operation, with each switching cycle (PWM cycle), charge is deposited on the capacitor of the filter via the inductor such that the capacitor voltage tends toward line voltage. When the main-switch turns "off", the capacitor charge is dissipated into the load and the capacitor voltage tends toward zero. This is repeated at high frequency for each switching cycle. Ideally, the average voltage across the capacitor would be a fraction of the line voltage proportional to the PWM proportion.

However, the present invention is focussed on solving, at least, the problem of when the load impedance is high, the capacitor charge cannot dissipate adequately during the main-switch "off" state and charge (voltage) tends to accumulate on the capacitor.

In the present invention, by providing a second inductance in series (whether the second inductance is provided as a separate element or incorporated into existing circuit elements, such as the existing circuit inductance L) with the existing output filter inductance which is designed to present high impedance at switching frequencies at relatively low currents (which corresponds to low load conditions) it has been found that the switching currents flowing in the filter, at low loads, are reduced so that the load impedance is sufficient to prevent the build-up of charge on; the output capacitor. The second inductance is designed so that when the converter load is increased, the second inductor core progressively saturates so that it presents low impedance to switching frequencies at high load conditions. By carefully selecting the value and saturation characteristics of the second inductance and its core material and its characteristics, including permeability, it is possible to alleviate the problem of the charge build-up problem in the output filter typical with that of the prior art output filter designs.

The preceding example uses two series inductors to achieve the required characteristic, which is adaptive to load current Those skilled in the art would appreciate that the required inductance characteristic might be achieved via other means.

For example, the inductance might be constructed using multiple core elements shared by one or more windings. In this case the core would be selected, by virtue of material and/or design, so that the net permeability of the core, and therefore, the inductance possessed a characteristic generally inversely proportional to current.

Alternatively, a single core might be employed, that core being composed of material, perhaps composite, such that the required permeability, and thus inductance, characteristic is obtained.

Essentially, the inductance characteristic should be designed, as near as possible, so that the charge and discharge time constants, with respect to switching PWM) frequencies, for the converter output filter capacitor tend to be equal for all load impedances.

Surge Detection

The present invention also serves to detect and limit surge currents and therefore reduces electrical and thermal stresses applying to circuit components of the power converter and externally connected equipment including the load.

If a current spike is detected, the pulse width is decreased (PWM turned off) and accordingly, the amplitude of the spike is reduced, thus overcoming or controlling the output of the spike.

The present invention provides a method of controlling over-current and/or short circuit conditions in a circuit by providing PWM sampling of the input waveform, measuring current as it passes through a mainswitch, turning the mainswitch off in response to the current measurement of an over-current condition and adjusting the PWM in an over-current condition, and at a frequency that serves to rapidly attenuate the current through the converter.

The essence of this aspect of the invention is that the current measurement is made as it passes through the main-switch as opposed to measuring the load current. This means that the current measurement is "real-time" and can be used to control the main-switch current at the frequency of the PWM. The prior art would teach us to measure the output (load) current and to use this measurement to modify the PWM. This may be too slow (due to the effect of the output filter) to adequately protect the power transistor of the main-switch. Furthermore, the prior art cannot measure the current flowing in the sub-switches of the converter and therefore cannot protect them or the main-switch in some circumstances. The present aspect enables more accurate surge current limiting in the main-switch, enhancing the reliability of the converter.

Networking

The current invention addresses the problems noted above by interfacing the local user interface device(s) to the dimmer using a local area network and making the user interface panel a detachable plug-in to the dimmer unit. In fact, it need never be attached at all. In the present aspect, implementation of this concept, a vestigial control panel is provided in addition to the networked (main) panel to enable basic functionality when the main panel is removed. This would not be a mandatory requirement.

In this regard, the present invention provides a control unit adapted to control a power converter, the control unit being provided integrally with the power converter in which the control unit is attached to and communicates directly to the power converter, or remotely of the power converter in which the control unit is detached and communicates remotely via a suitable mode of communication to the power converter. A network of power converters coupled via a communication network and including this control unit is also provided This means that, say, one user interface module may be used to control a multiplicity of dimmer units or racks. This local control module may be located either nearby or remotely. This remote control network may be independent from the lighting control network.

It also means that the user interface may be removed entirely (since it is not essential for the basic function of the dimmer) thus adding security from tampering.

Other aspects of invention are also disclosed.

Figure 3:
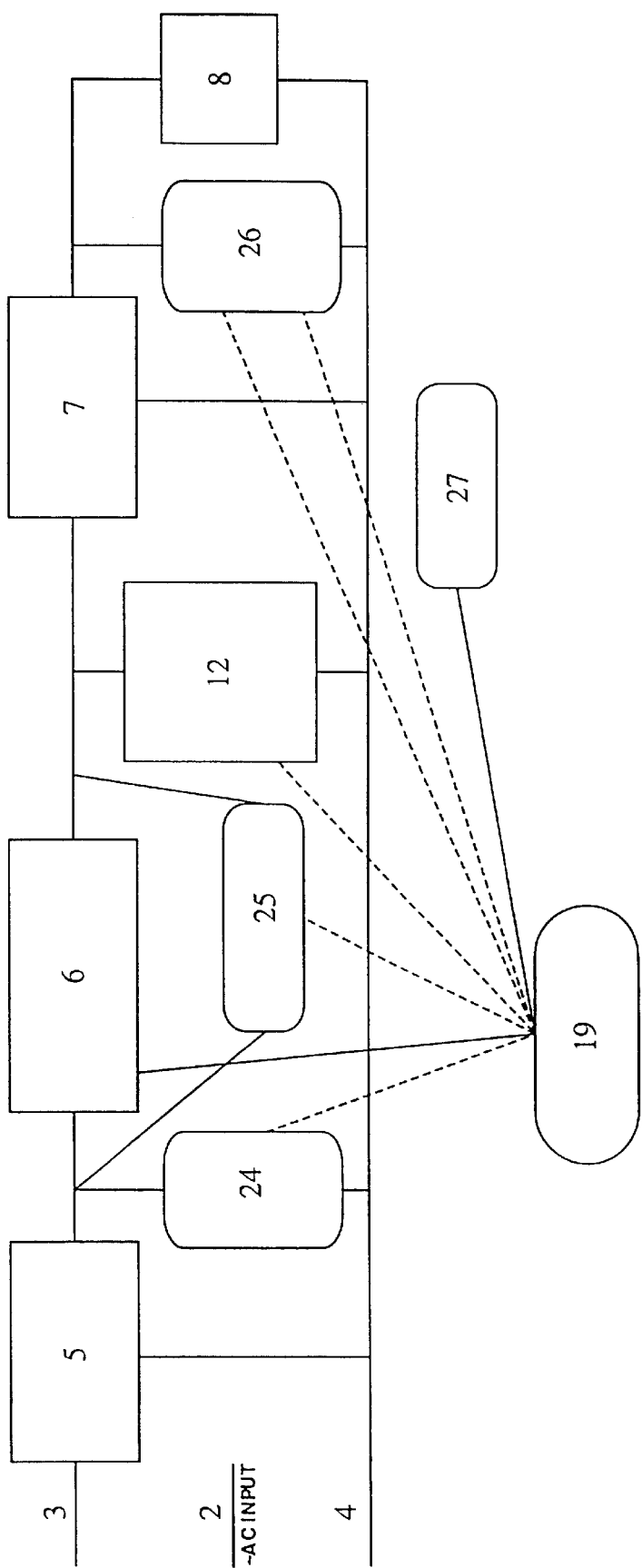
Figure 4:
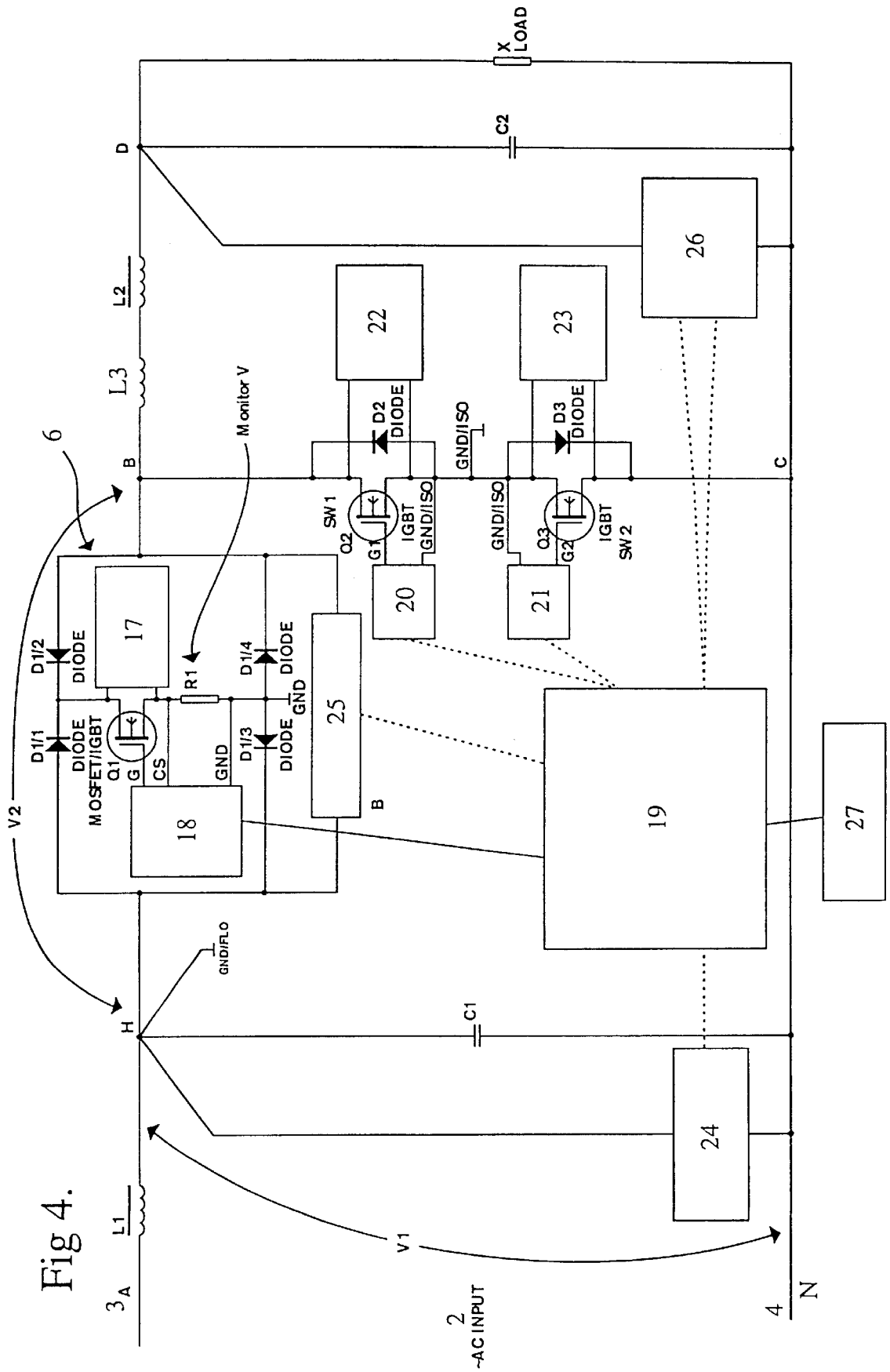
Figure 5A:
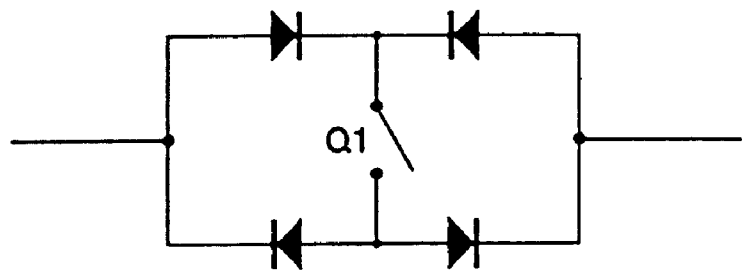
Figure 5B:
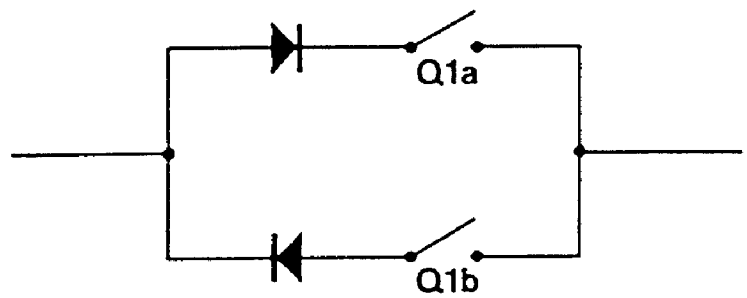
Figure 5C:
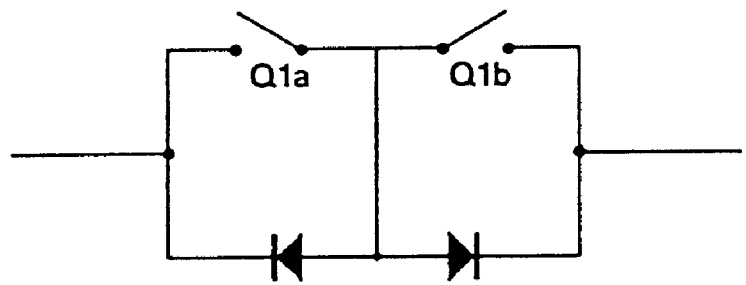
Figure 9:
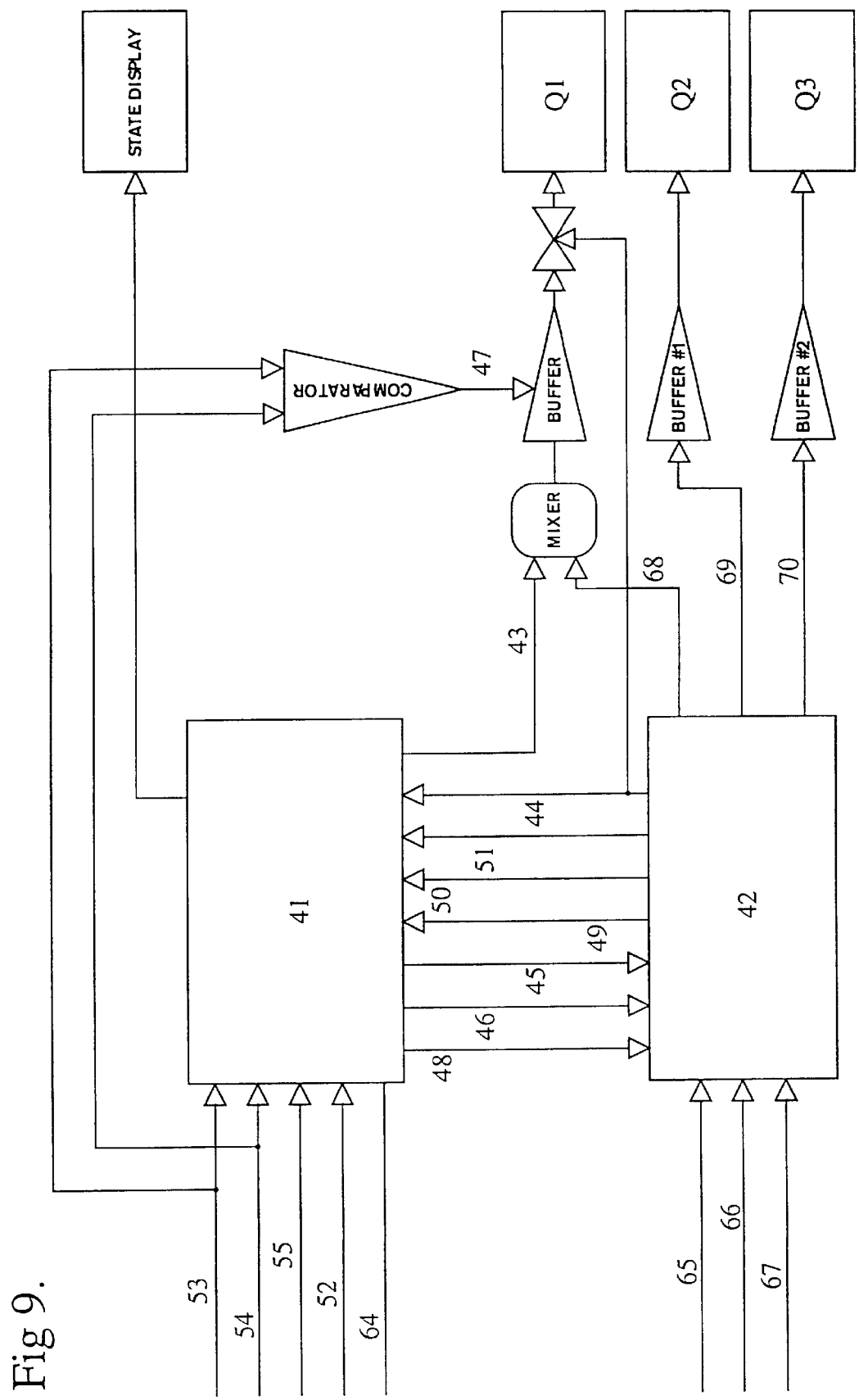
Figure 10:
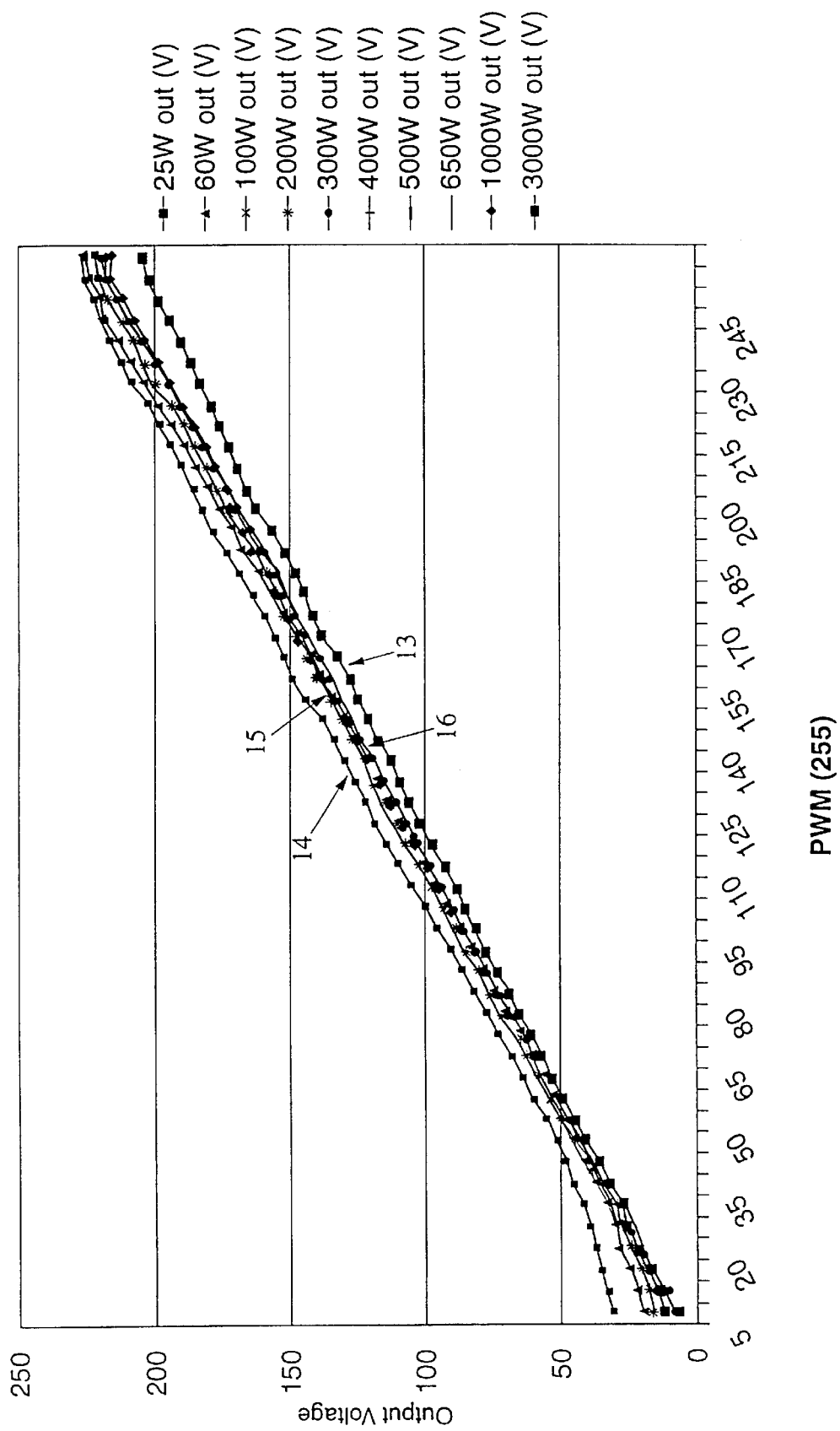
Figure 12:
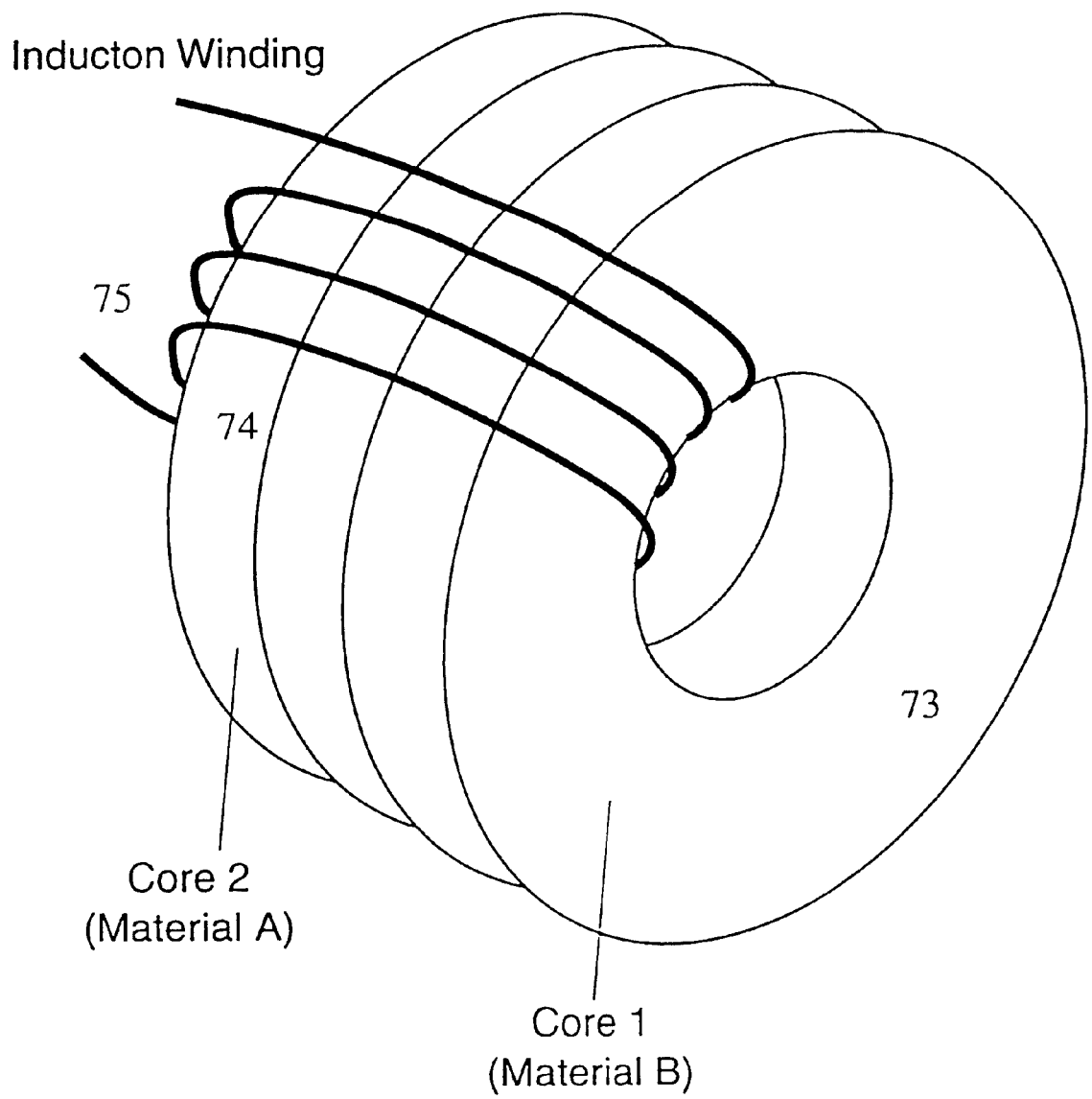

A preferred embodiment relating to aspects of the present invention will now be described with reference to the accompanying drawings, in which:

FIGS. 1A, 1B, 1C and 1D illustrate problems associated with prior art power converters, FIG. 2 illustrates transfer characteristics of a prior art power converter, FIG. 3 illustrates in block diagram form one embodiment an AC Power Converter according to the present invention, FIG. 4 provides more detail of an embodiment of an AC Power Converter according to the present invention, FIGS. 5A, 5B and 5C illustrate a number of alternative switch arrangements which may be used in place of the main switch and/or the subswitch(s) to suit different applications, FIGS. 6A, 6B, 6C and 6D illustrate waveforms associated with the present invention, FIGS. 7 and 8 illustrate waveforms (Inductive Load Current Flow) and (Capacitive Load Current Flow) respectively related current flows through an embodiment of the present invention, FIG. 9 illustrates a control circuit block diagram, FIG. 10 illustrates transfer characteristic or a power converter according to the present invention, FIG. 11 illustrates a networking aspect of the present invention, and FIG. 12 illustrates one embodiment of an adaptive-inductance.

GENERAL DESCRIPTION

One embodiment of the present invention is a microprocessor based sine wave AC power converter, designed for adapting to various loading conditions (resistive, capacitive and inductive loads). The microprocessor may also be provided in the form of control logic, having a suitable/required controlling function. The present invention also accommodates loads of varying reactance such as a discharge lamp, which in operation displays a change in reactance value as it heats up. The present invention can be accommodating of many and different types of loads because the invention monitors the polarity difference.

Furthermore, in the present invention, the power factor remains substantially constant while dimming occurs, and does not worsen significantly at lower power (greater dimming) levels. Also detection of over current and/or short circuit current conditions can reduce or eliminate the need for Circuit Breakers (CB). Still further, the input and output of the present invention share the same neutral line enabling the load energy to feed back through the mains supply. This allows the use of standard cabling and eliminates any need for oversized or separated neutral wiring. Other advantages of the present invention will also be described.

Function

Generate a variable AC voltage output with the same frequency and form as the input
Adaptive load control for various types of load (reactive and resistive)
Over-load and short circuit discriminating
Over-current presetting and (PWM) cycle-by-cycle shutdown on detecting over-current shutdown output on detecting short-circuit current
Other panel display functions etc.

Circuit Structure

The main structure of one embodiment of an AC Power Converter according to the present invention is illustrated schematically in FIG. 3 and is shown in FIG. 4 in more detail. The same numeral is used to denote the same element, even if shown in different figures.

There are nine parts usually included in an AC Power Converter but which are not all necessarily essential to the present invention. These are:

1. Input Filter

Input filter block 5 is composed of an inductor (L1) and a capacitor (C1), it is a simple LC low pass filter. The main purpose of the input filter is to block high frequency harmonics from feeding back through the main network from the AC Power converter.

2. Main Switch (Driver & Protection)

Main switch block 6 is composed of an IGBT, MOSFET or similar, power switch (Q1), a bridge rectifier (D1, but shown as a diode bridge D1/1, D1/2, D1/3 and D1/4) and a control circuit including over-voltage protection 17 and current limiting and power switch driver circuit 18. Control of the main switch on and off will change the amplitude of the output voltage for adapting different loading condition. Any one of the switch arrangements as illustrated in FIG. 4, 5A, 5B or 5C may be used as the 'main switch'. Equally other switch arrangement(s) may also be used in providing a switching function.

3. Sub Switches (Driver & Protection)

Sub switches block 12 is composed of two IGBTs, MOSFETs or similar. (Q2, Q3), two ultra-fast soft-recovery diodes (D2, D3) and two sub switch driver circuits 20 and 21 controlling each sub switch 'on' and 'off' to control the freewheel current. Over-voltage protection 22 and 23 is also preferably provided. Equally, any one of the switch arrangements as illustrated in FIG. 4, 5A, 5 or SC may be used as the 'sub switch' and/or other switch arrangement(s) may also be used in providing a sub switching function.

4. Output Filter

Output filter block 7 is composed on an inductor (L2) and a capacitor (C2), it is a simple LC low pass filter. The main purpose of the output filter is to filter out high frequency harmonics to the load. In accordance with a further and distinct aspect of the present invention, a further inductor L3 is provided in series with inductor L2 to provide a relatively linear transfer characteristic throughout the output range of the circuit.

5. Input Voltage Polarity Sensing Circuit

Input voltage polarity sensing circuit 24 is opto-isolated from the main switch control circuit, and preferably provides an input voltage polarity signal to the main switch control circuit which along with the load current direction signal is used to drive the main switch and sub switches in the correct sequence.

6. Current Direction Sensing Circuit

Current direction sensing circuit 25 is opto-isolated from the main switch control circuit, and preferably provides a load current direction signal to the main switch control circuit which along with the input voltage polarity signal is used to drive main switch and sub switches in the correct sequence.

7. Output Voltage Amplitude Sensing Circuit

Output voltage amplitude sensing circuit 26 is also opto-isolated from the central control circuit, and preferably provides an analog signal which is proportional to the output voltage to the central control circuit. This signal can be monitored by the control logic, enabling it to regulate the output voltage. Circuit 26 can also be used to detect a short circuit.

8. Temperature Sensing Circuit

Temperature sensing circuit 27 provides an analog signal, proportional to heatsink or other ambient temperature, to the central control circuit. This signal is monitored by the control logic, for example enabling it to turn the main switch off when the temperature is over a certain degree (say 90° C.) or enabling reduction of the power output.

9. Central Control Circuit

The central control circuit 19 comprises the required microprocessor(s) and/or associated software and/or hardware circuits. It is preferred that switch control and other important signals are handled by discrete hardware for a faster response. The PWM frequency base can be generated by appropriate circuitry which can also process other less time critical system states signals (like over-voltage, temperature, input settings, etc).

MAIN SWITCH PRINCIPLE

A load may be considered as one of three types:

| | |
|---|---|
| Capacitive load | input current leads input voltage |
| Inductive load | input current lags input voltage |
| Resistive load | input current and input voltage are in phase |

Basically, one aspect of the invention operates as follows:

The IGBT and associated controlling circuit form the "main switch" 6. By changing the duty cycle of the PWM, (PWM (1)), the amplitude of the waveform is affected. Looking at FIG. 6a, waveforms 28 and 29 for voltage (V) and current (I) respectively are shown out of phase, as would be the case for a inductive load. FIG. 6b shows waveform 30 the PWM(1), which when applied to the waveform of FIG. 6a, results in the waveform 31 of reduced amplitude (not changed frequency) of FIG. 6c.

One aspect of the present invention is to keep 'on' the main switch when the is a polarity difference between voltage and current waveforms 28,29. FIG. 6d illustrates this in waveform 32, and the extended 'on' time illustrated at 33. The PWM(2) is altered to keep the main switch "on" for at least the period during which the V & I waveforms are of opposing polarity. This "on" time enables energy stored in the load (8 of FIG. 3), to be feedback to the supply input (2 of FIG. 3) In this way, the energy is not dissipated in the circuit but returned to supply and thus there is a resultant increase in efficiency. If, on the other hand, energy is allowed to remain residual in the load 8 and output circuitry 12,7 as freewheeling current, as is the case with prior art type arrangements, the energy stored may eventually lead to destruction of one or more of the circuit's components. This destruction is obviously a drawback in prior art arrangements.

Referring to FIG. 4, FIG. 7 (inductive load) and FIG. 8 (capacitive load), the input current and voltage can be considered as either in or out of phase with each other for each cycle, the following control strategies are adopted to fit each case for each cycle.

In FIGS. 7 and 8, the switch positions "on" or "off" are illustrated at the foot of the diagram by way of FIGS. 7A to 7E and 8A to 8E respectively and refer by arrow to the portion of the corresponding waveform cycle.

In FIG. 7, a voltage waveform 34 leading a current waveform 35 is shown.

In FIG. 8, a current waveform 36 leading a voltage waveform 37 is shown.

Waveform 38 illustrates control of the MAIN power switch Q1 on and off (at high frequency, in the embodiment shown at 30 KHz) to control the amplitude of the output AC voltage. It should be appreciated that the frequency of waveform 38 can be varied to suit the particular application of the present invention.

Waveforms 39 and 40 turn SUB power switch Q3 on and Q2 off (at line frequency in this example) while input voltage is in positive cycle (voltage across points H and C of FIG. 4 is positive). As shown in FIGS. 7B and 8B, current flows into load from the active terminal (current flows from point H to point B of FIG. 4). This will enable the load current to pass through power switch Q3 and diode D2 while the MAIN switch is off. It should be appreciated that the frequency of waveforms 39 and 40 can be varied to suit the particular application of the present invention.

Also waveforms 39 and 40 turn SUB power switch Q2 on and Q3 off (at line frequency, in this example) while input voltage is in negative cycle (voltage across points H and C of FIG. 4 is negative). As shown in FIGS. 7D and 8D current flows into load from neutral terminal (current flows from point B to point H of FIG. 4). This will enable the load current to pass through power switch Q2 and diode D3 while the MAIN switch is off.

The circuit switch configurations are shown in FIGS. 7A, 7C and 7E for a leading voltage and 8A, 8C and 8E for a leading current. Enabling MAIN power switch Q1 on and SUB power switch Q2 and Q3 off can alleviate the effects of an input current short circuit and also improves power factor during the periods that the load is in generation state (which means that during negative cycle the current flows into active terminal from load (see FIGS. 7a, 7e) and during positive cycle the current flows into neutral terminal from load (see FIG. 7c). For FIG. 8, the converse applies).

As can be seen from the description above, Q2 and Q3 have 3 different configurations, which are:

Q2 off, Q3 off, or

Q2 on, Q3 off, or

Q2 off, Q3 on.

Turning to FIG. 4, the control circuit 19 uses sensor 24 (input voltage polarity sensing circuit) and sensor 25 (current direction sensing circuit) to sense resistive, capacitive or inductive loads. The two sensors affect the way in which the free wheel subswitches Q2 and Q3 are controlled. When the inputs to sensors 24 and 25 are in phase, subswitch Q2 or Q3 is turned on. The main switch Q1 is turned "on/off" with a PWM signal. If the inputs to sensor 24 and sensor 25 are out of phase, leading or lagging, subswitches Q2 and Q3 are turned off and the mainswitch is turned on in accordance with the description above to ensure that no short circuit occurs to the input.

Alternatively, the operation of the subswitches Q2 and Q3 and the main switch Q1 can be controlled in accordance with a comparison of the polarity of voltages V1 and V2, in a manner in principle similar to that described above.

The control of the main switch and the subswitches may be hardware and/or software controlled. Hardware is preferred because there is less component propagation delay between sensing polarity and an appropriate signal being provided to each switch.

Current through Q1 is monitored in association with resistor R1 as shown in FIG. 4. The resistor is in series with the main switch Q1, Voltage is also monitored at R1. By monitoring the resistor R1 instead of the main switch Q1, batch differences between one main switch and another main switch from circuit to circuit can be eliminated thus, providing a more reliable input source for the main switch control circuit 19 to monitor changes in current and voltage, without compensating for different batch characteristics of Q1 components.

Circuit Design

A block diagram of control circuit 19 of the AC Power Converter described in this embodiment is shown in FIG. 9. Although control and logic functions could be handled by the microprocessor 41 in software, it is preferred that over-current/short circuit protection and switch control states are handled by hardware 42 to enable fast control response times. Circuitry associated with the microprocessor 41 is used to generate a reference PWM signal 43 and to process less time critical signals.

Control Signals

Many different methods and apparatus can be used to generate the required control signals. Assembly of the apparatus would be within the ambit of a skilled person. Various methods of control and logic functionality can also be employed utilising the principles of the present invention. Nonetheless, there is now describe one example which is not intended to be construed as limiting the present invention. In this example, there are several control signals required to monitor and control, they are:

PWM

PWM signal 43 can be in any duty cycle at any moment (include start up) depending on the required output voltage SC STATE (Short Circuit State)

SC STATE signal 44 will stay high initially when the control circuit is powered up. A SC RESET pulse 45 will reset this signal 44. It will be set by a MAIN DISABLE pulse 46 or an output short circuit condition 47.

SC RESET (Short Circuit Reset)

SC RESET signal 45 should stay low initially when the control circuit is powered up. A pulse of 1 μs or more will enable normal main switch operation to occur. This signal preferably occurs at the zero crossing or while the PWM signal is off.

MAIN DISABLE

MAIN DISABLE signal 46 should stay low initially when the control circuit is powered up. A pulse of 1 μs or more will disable the main switch operation. In FIGS. 7 and 8, a signal of 30 kHz is shown as a preferred signal driving the main switch Q1.

SUB ENABLE

SUB ENABLE signal 48 should be low initially when the control circuit is powered up and stay high soon after system has powered up. It should be high all the time while the main switch Q1 is switching, it must be high before sending a SC RESET pulse 45. As can be seen from FIGS. 7 and 8, the frequency of operation of the subswitches Q2,Q3 may be much reduced compared to that of the main switch Q1. In practice it has been found, and as is illustrated in FIGS. 7 and 8, that each of the subswitches Q2,Q3 needs to be enabled only once per cycle. Thus for Australia, where there is a 50 Hz power cycle, the subswitches Q2,Q3 may be switched at 50 Hz, whereas for countries such as USA where there is a 60 Hz power cycle, the subswitches Q2,Q3 may be switched at 60 Hz.

LOAD STATE

LOAD STATE signal 49 will stay high if the load is inductive and stay low if the load is capacitive.

V-ZERO CROSS

V-ZERO CROSS signal 50 is a square wave signal at twice line frequency. The rising edge of a V-ZERO CROSS signal 50 is trigged by each input voltage zero crossing and its falling edge is trigged by a time delay circuit. On sensing the tailing edge of a V-ZERO CROSS signal 50, the MICRO 41 reads the value of the output voltage analog signal which is used to regulate the output voltage.

I-ZERO CROSS

I-ZERO GROSS signal 51 is a square wave signal at twice line frequency.

The rising edge of an I-ZERO CROSS signal 51 is trigged by each input current zero crossing and its falling edge is trigged by a time delay circuit. On sensing the falling edge of an I-ZERO CROSS signal 51, the MICRO 41 reads the value of the output current analog signal which can be used for fault detection in the load.

OUTPUT VOLTAGE

OUTPUT VOLTAGE signal 52 is an analog signal which is proportional to the output voltage. The MICRO 41 will use this signal to regulate and display the output voltage value.

OVER-CURRENT

OVER-CURRENT signal 53 is an analog signal which is proportional to the output current. The MICRO 41 can use this signal to display the output current value and perform fault detection in the load.

OVER-CURRENT PRESET

OVER-CURRENT PRESET signal 54 is an analog signal which is proportional to the current preset value. The MICRO 41 can use this signal to display the over-load current preset value.

TEMPERATURE PROB

TEMPERATURE PROB signal 55 is an analog signal which is proportional to the heatsink temperature. A MICRO 41 will use this signal to turn the main switch Q1 off when the temperature reaches a certain temperature (say 90° C., but this can be predetermined as desired). It can be appreciated that some other suitable response can also be used. COMM signal 64 is a communications signal from some other control device such as a PC, other microprocessor based system or similar. Typically this signal would be bi-directional and convey information such as required output level, temperature, status etc between the power converter and the other system.

CURRENT DIRECTION signal 65 and INPUT VOLTAGE POLARITY signal 66 are used to inform the controller 42 concerning the reactance of the connected load. Using this information the controller 42 determines the proper sequencing of the main (Q1) and sub (Q2 & Q3) switches in the manner described.

OUTPUT VOLTAGE LOGICAL signal 67 indicates the state of the output voltage. This is a logical signal which, when true, indicates that the output voltage is above some preset threshold. This signal is used in conjunction with OVERCURRENT signal 53 by the controller 42 to determine the presence of a short circuit on the output of the power converter. Alternatively, the output voltage signal 67 could be an analogue signal and the hardware controller 42 could apply the threshold criterion.

MAIN STATE signal 68 is used to override the PWM signal 43 to hold the main-switch Q1 "on" in the case where the CURRENT DIRECTION 65 and INPUT VOLTAGE POLARITY 66 indicate that the instantaneous input voltage and current to the power converter are out of phase.

Signals SUB STATE #1 (69) and SUB STATE #2 (70) are signals which determine the "on" or "off" state of the sub switches Q2 and Q3 in accordance with the principle described and illustrated in FIGS. 7 and 8. The hardware controller 42 in accordance with the timing principles so illustrated determines the required switch states.

Other Aspects

The filter circuits (L1, L2, C1, C2) as shown on FIGS. 3 and 4 are introduced for the purpose of alleviating harmonic effect and to meet EMI standard. The parameters of the filter circuits are selected according to the main switching frequency which will effect the converting efficiency.

A low to medium frequency IGBT or MOSFET can be used for the SUB power switches Q2,Q3, a high frequency IGBT or MOSFET can be used for the MAIN power switch Q1.

Transfer Characteristic

In accordance with another aspect of the present invention, the problem of charge build up on the output filter capacitor is addressed in a manner that substantially improves the linearity of the circuit transfer characteristic when operating in response to small load outputs.

The output filter is constructed so as to limit the build-up of charge within the converter output filter when high impedance loads are connected. Typically this condition might arise when a Power Converter is used to drive a load substantially less than the converter's rating. Typically the output filter is composed of series inductance and parallel capacitance. In the prior art, the inductance is specified to present a high impedance to switching harmonics whilst a relatively low impedance to line frequency. Conversely, the capacitance is designed to present low impedance at switching frequencies and high impedance at line frequencies. Together the inductance and capacitance effectively block the passage of switching frequencies and harmonics to the load. Ideally, the performance of the filter is optimal for the highest possible inductance and capacitance consistent with overall low filter impedance at line frequency. However, increasing the inductance can give rise to saturation of the inductor core with consequent poor filter performance.

In relation to this aspect of the present invention, and with reference to FIG. 4, one embodiment is shown in which the adaptive inductance is made of two inductor elements, in which a further inductor L3 is added in series with inductor L2. Inductors L2 and L3 can be referred to as an "adaptive inductance". This inductor L3 is designed to present high impedance at switching frequencies and at low currents, which corresponds to low load conditions. In this way the switching currents flowing in the filter are reduced so that the load impedance is sufficient to prevent the build-up of charge on the output capacitor. However, when the converter load is increased, the core of the inductor L3 is selected or designed so that it progressively saturates and presents a relatively low impedance to switching frequencies at relatively high load conditions. Hence its adaptability.

For example, the inductance might be constructed using multiple core elements shared by one or more windings. In this case the core would be selected, by virtue of material and/or design, so that the net permeability of the core, and therefore, the inductance possessed a characteristic generally inversely proportional to current.

Alternatively, a single core might be employed, that core being composed of material, perhaps composite, such that the required permeability, and thus inductance, characteristic is obtained.

Essentially, the inductance characteristic should be designed, as near as possible, so that the charge and discharge time constants, with respect to switching PWM) frequencies, for the converter output filter capacitor tend to be equal for all load impedances.

One example is illustrated in FIG. 12, showing an inductance composed of 2 cores (core 72 and core 74) around which a winding 75 is provided. As noted above, the type of inductor element, core type and composition can be varied in order to provide the desired transfer characteristic.

The results of this aspect of invention are illustrated In FIG. 10. By comparison to FIG. 2 of the prior art, the same transfer characteristics are denoted the same reference numerals. It is considered quite evident that the transfer characteristics illustrated in FIG. 10 are relatively more linear than those illustrated in FIG. 2. The resulting output can also be compared with regard to 50 PWM on each figure. In FIG. 2, at this point, the output voltage for line 14 was (a non-linear) 160 volts, rather than 40 volts, for line 13. Looking now at FIG. 10, at 50 PWM, line 14 shows a little less than 50 volts, rather than 40 volts for line 13. This represents a considerable improvement in the desired linear relationship for a transfer characteristic between PWM and output voltage of a power converter.

In essence, this aspect requires a saturating inductor L3 in series with a non-saturating inductor L2, thus by carefully selecting the value of inductance L3 and its core material, it is possible to counteract the charge build-up characteristic in the output filter typical with the prior art. This will obviously vary dependent upon the application and desired characteristic sought for the power converter. In the present embodiment, inductor L2 is a bobbin type with a MnZn core, and inductor L3 is a toroidal type with a MnZn core. The present invention is not to be limited to the use of only these types of inductors. The present invention may be used in a switch mode power converter or an AC power converter.

Surge Detection

The present invention also serves to detect surge currents. If a current spike is detected, the pulse width is decreased (PWM turned OFF) and accordingly, the amplitude of the spike is reduced thus, overcoming or controlling the output of the spike.

In another aspect of invention there is provided a method of controlling over voltage or over current conditions in a circuit by sampling the over-voltage or over-current at a frequency which is high enough to attenuate the amplitude of the signal output to the circuit.

Referring to FIG. 4, consider a current change through output filter inductors L2 and L3 as:

$$\Delta I = V2/L * \Delta T$$

here $\Delta T$ is the time period during which the main switch Q1 is on $\Delta I$ is current change during the time period $\Delta T$ V2 is the voltage which crosses the inductor L2 during the time period $\Delta T$ L is the inductance of inductors L2 and L3

By controlling the main switch Q1 on time, $\Delta T$ effects the current change $\Delta I$. When an overload occurs, the voltage V2 will increase, which will in turn increase the current $\Delta I$ during the same period $\Delta T$. By comparing the instantaneous current with a preset current level (53 and 54 respectively of FIG. 9) during each switching cycle, if the transient current is over the preset current level, main switch Q1 can be turned off earlier than it would have been. This will limit the average current through inductor L2 and in turn will limit the maximum load current.

Changing the preset current level 54 will change the turn-on time of main switch Q1 in affect setting the maximum load current. Each time a transient current is detected over the preset current level, main switch Q1 is turned off which in turn will effect the maximum load current.

By sensing output voltage and transient currents it is possible to discriminate between an overload and a short circuit output condition. If the output voltage is within a certain level while over-current occurs, an overload condition is detected. If output voltage is near zero while aver-current occurs, a short circuit condition is detected. If a short circuit condition is detected, the main switch Q1 is turned off permanently.

Networking

A further aspect of the present invention relates to problems encountered when a number of power converters are used collectively to control a number of associated loads. Referring to FIG. 11, one load 56, comprising one or a number of lights or other types of loads is connected to a single power converter, called a "Channel". A number of channels can be provided in a modular form as a unit 58, in which case some of the control logic of each converter (see feature 19 of FIG. 3) is shared by a number of channels. A number of units may be housed together in a rack 59. Equally, a unit may be free standing.

The units can be interconnected for the purpose of remote control and monitoring by a network 71. A variety of network types may be used such as DMX, SMX, ACN, AMX etc. These networks allow remote control of the output level of each channel within a unit. Usually the processing means for facilitating the network communications is provided on a Unit 58 or rack 59 basis. Regardless of the configuration, each of the channels in the system will be uniquely addressable.

In prior art arrangements, each unit is provided with a user interface control panel via which the operator is able to access the setup of each unit and/or channel contained within that unit, and to observe various parameters associated with the unit and its channels. Each unit would have its own corresponding control panel that could access the function of that unit alone.

In this aspect of the invention, a Control Network 60 is provided connecting a plurality of units through a network such as Ethernet or LON™. In this aspect of the invention, the unit control panel 62 is connected to the unit via the Control Network 60. By this means each control panel 62 can be arranged via appropriate logic and/or software to access the functions of every unit connected to the control network 60. In this way the human interface required to give instruction or monitor performance, when necessary, may be provided through the network.

In the current aspect, the Control Network 60 comprises a physically separate network to the Lighting Control network 71 however it is possible to combine these two logical networks onto one physical network.

The human interface may be provided through a familiar personal compute (PC) 61 or similar generic controller, or a compatible lighting controller 63, or a dedicated control unit 62. It is preferred for simplicity and convenience, to have a dedicated control unit capable of being used either locally or remotely. When used locally this controller may be mounted onto the power control module (unit) 58 as an integral part of the unit. This both complements the design aesthetics and provides a robust and reliable human interface. When used remotely the control unit 62 may be operated as a stand alone controller mounted on a wall, hand held, or other such convenient location. The controller has access to all channels, units or racks connected to the network.

This means that, say, one user interface module may be used to control a multiplicity of dimmer units or racks. This local control module may be located either nearby or remotely. This remote control network may be independent from the lighting control network.

It also means that the user interface may be removed entirely (since it is not essential for the basic function of the dimmer pack) thus adding security from tampering.

The essential the aspect of this invention is that the now common user interface of the dimmer itself can be shared among a number of units because of the network-able aspect of it.

In the present invention, each unit 58 may be optionally fitted with an additional user interface panel 72 providing a minimum subset of the total unit functions so that the unit can function without a control panel 62 connected at all.

The claims defining the invention are as follows:

1. An AC-AC power converter including:

input means for receiving supply power;

switch means electronically connected to the input means, The switch means for providing control of power delivered to an output load;

control means electronically connected to the switch means, the control means for controlling the operation of the switch means; and a first sensing circuit for providing a first signal indicative of voltage input to the converter;

a second sensing circuit for providing a second signal indicative of input current To the converter;

detecting means, responsive to the sensing circuits, to detect a difference in polarity between the first and second signals;

wherein the switch means is operable to switch between a first and a second state, the first state being 'on' and the second state being 'off', and wherein the control means causes the switch means, which is for providing control of power delivered to an output load, to be in the first state responsive to the detecting means detecting a difference in polarity, thereby dissipating a residual energy in the power converter.

2. The power converter as claimed in claim 1, wherein the switch means is in the first state when there is a difference in polarity detected.

3. The power converter as claimed in claim 1, in which the switch means is in the first state when a difference in polarity between voltage and current waveforms is detected.

4. The power converter as claimed in claim 3, in which the current waveform is input current and the voltage waveform is input voltage.

5. The power converter as claimed in claim 1, in which the switch means is in the first state when a difference in polarity between input voltage and voltage across the switch means is detected.

6. The power converter as claimed in claim 1 in which the power converter is a high frequency switch mode converter.

7. The power converter as claimed in claim 1, wherein the first sensing circuit senses current or voltage.

8. The power converter as claimed in claim 1, wherein the second sensing circuit senses current or voltage.

9. A method of reducing energy dissipation in an AC-AC power converter, the method including the steps of;

measuring a signal indicative of input voltage to the converter;

measuring a signal indicative of input current to the converter;

detecting a polarity of each of the measured voltage signal and measured current input to the converter, and enabling a switch 'on' thereby dissipating a residual energy in the power converter in response to detecting an opposing polarity between the polarity of the measured voltage signal and the polarity of the measured current input to the converter.

10. The method as claimed in claim 9, in which the switch is enabled 'on' when a difference in polarity between voltage and current waveforms is detected.

11. The method as claimed in claim 10, in which the voltage waveform is input voltage and the current waveform is input current.

12. The method as claimed in claim 9, in which the switch is enabled 'on' when a difference in polarity between input voltage and voltage across the switch is detected.

13. A dimmer operable to alter supply power to an output device, said dimmer comprising:

an interface for altering the supply power to the output device; and a power converter electrically coupled to said interface, the power converter including:

input means for receiving input power to the power converter;

a switch electronically connected to the input means, the switch for providing control of the supply power delivered to the output device;

a control unit electronically connected to the switch, the control unit for controlling the operation of the switch unit; and a first sensing circuit for providing a first signal indicative of voltage input to the converter;

a second sensing circuit for providing a second signal indicative of input current to the converter;

a detector, responsive to the sensing circuits, to detect a difference in polarity between the first and second signals;

wherein the switch is operable to switch between a first and a second state, the first state being 'on' and the second state being 'off', and wherein the control unit causes the switch, which is for providing control of the supply power delivered to the output device, to be in the first state responsive to the detector detecting a difference in polarity, thereby dissipating a residual energy in the power converter.

14. The dimmer according to claim 13, wherein the interface is a mechanical interface for altering the supply power via the power converter delivered to the output device.

15. The dimmer according to claim 13, wherein the interface is an electrical connector adapted to receive communication from a controller to alter the supply power via the power converter delivered to the output device.

* * * * *